(12) United States Patent
Pawlowski

(10) Patent No.: US 6,725,344 B2
(45) Date of Patent: *Apr. 20, 2004

(54) SRAM WITH TAG AND DATA ARRAYS FOR PRIVATE EXTERNAL MICROPROCESSOR BUS

(75) Inventor: Joseph T. Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/213,696

(22) Filed: Aug. 6, 2002

(65) Prior Publication Data

US 2003/0005238 A1 Jan. 2, 2003

Related U.S. Application Data

(63) Continuation of application No. 09/387,031, filed on Aug. 31, 1999, now Pat. No. 6,446,169.

(51) Int. Cl.[7] .............................................. G06F 12/00
(52) U.S. Cl. ....................... 711/146; 711/131; 711/167; 711/149; 711/150
(58) Field of Search ................................. 711/131, 149, 711/150, 146, 167; 364/200; 710/104, 107, 100; 365/189.04

(56) References Cited

U.S. PATENT DOCUMENTS

| | | | |
|---|---|---|---|
| 4,881,163 A | 11/1989 | Thomas et al. | 710/56 |
| 5,018,061 A | 5/1991 | Kishigami et al. | 711/3 |
| 5,301,296 A | 4/1994 | Mohri et al. | 711/128 |
| 5,319,766 A | 6/1994 | Thaller et al. | 711/136 |
| 5,353,424 A | 10/1994 | Partovi et al. | 711/128 |
| 5,414,827 A | 5/1995 | Lin | 711/135 |
| 5,423,019 A | 6/1995 | Lin | 711/135 |

(List continued on next page.)

OTHER PUBLICATIONS

Handy, "The Cache Memory Book", ©1998 Academic Press, Inc., pp. 12–13, 67, 88, 124.*
Handy, Jim, *The Cache Memory Book*, (c) 1998, pp. 19–20.

Primary Examiner—Glenn Gossage
Assistant Examiner—B. R. Peugh
(74) Attorney, Agent, or Firm—Dorsey & Whitney, LLP

(57) ABSTRACT

The present invention includes a microprocessor having a system bus for exchanging data with a computer system, and a private bus for exchanging data with a cache memory system. Since the processor exchanges data with the cache memory system through the private bus, cache memory operations thus do not require use of the system bus, allowing other portions of the computer system to continue to function through the system bus. Additionally, the cache memory and the processor are able to exchange data in a burst mode while the processor determines from the tag data when a read or write miss is occurring.

51 Claims, 7 Drawing Sheets

U.S. PATENT DOCUMENTS

| | | | |
|---|---|---|---|
| 5,448,742 A | 9/1995 | Bhattacharya | 711/154 |
| 5,469,555 A | 11/1995 | Ghosh et al. | 711/133 |
| 5,553,266 A | 9/1996 | Metzger et al. | 711/144 |
| 5,555,382 A | 9/1996 | Thaller et al. | 710/113 |
| 5,564,034 A | 10/1996 | Miyake | |
| 5,617,347 A | 4/1997 | Lauritzen | 365/49 |
| 5,682,515 A | 10/1997 | Lau et al. | 711/118 |
| 5,802,559 A | 9/1998 | Bailey | 711/118 |
| 5,809,537 A * | 9/1998 | Itskin et al. | 711/146 |
| 5,825,788 A | 10/1998 | Pawlowski | 714/763 |
| 5,860,104 A | 1/1999 | Witt et al. | 711/137 |
| 5,875,464 A | 2/1999 | Kirk | 711/129 |
| 5,878,245 A | 3/1999 | Johnson et al. | 711/154 |
| 5,893,146 A | 4/1999 | Pickett | 711/128 |
| 5,903,908 A | 5/1999 | Singh et al. | 711/122 |
| 5,913,223 A | 6/1999 | Sheppard et al. | 711/118 |
| 5,918,245 A | 6/1999 | Yung | 711/122 |
| 5,926,828 A | 7/1999 | Khandekar | 711/111 |
| 5,940,864 A | 8/1999 | Arimilli et al. | 711/163 |
| 5,987,544 A | 11/1999 | Bannon et al. | 710/100 |
| 6,065,097 A | 5/2000 | Feierbach et al. | 711/118 |
| 6,101,595 A | 8/2000 | Pickett et al. | 712/205 |
| 6,195,729 B1 | 2/2001 | Arimilli et al. | 711/119 |
| 6,298,423 B1 | 10/2001 | Johnson et al. | 711/154 |
| 6,321,359 B1 | 11/2001 | Pawlowski | 714/763 |
| 6,393,515 B1 | 5/2002 | Pollack et al. | 711/108 |
| 6,446,169 B1 * | 9/2002 | Pawlowski | 711/131 |
| 6,493,799 B2 | 12/2002 | Pawlowski | 711/118 |
| 6,526,469 B1 | 2/2003 | Drehmel et al. | 710/306 |
| 6,557,069 B1 | 4/2003 | Drehmel et al. | 710/307 |

* cited by examiner

SRAM WITH TAG AND DATA ARRAYS FOR PRIVATE EXTERNAL MICROPROCESSOR BUS

This application is a continuation of U.S. patent application Ser. No. 09/387,031, filed Aug. 31, 1999, now U.S. Pat. No. 6,446,169.

TECHNICAL FIELD

The present invention relates in general to cache memory systems that are coupled to processors and more particularly to a cache memory system adapted to be coupled to a processor through a private bus.

BACKGROUND OF THE INVENTION

FIG. 1 is a simplified block diagram of a computer 20 including a processor 22 and a memory system 24, in accordance with the prior art. The processor 22 is coupled to the memory system 24 through a system bus 26 that conveys data and addresses between system components. The computer 20 additionally includes a user input interface 34, such as a keyboard, mouse and the like, and a user output interface 36, such as a monitor, both coupled to the processor 22 through the system bus 26.

The processor 22 typically executes instructions read from the memory system 24 to operate on input data from the user input interface 34 and display results using the user output interface 36. The processor 22 also stores and retrieves data in the memory system 24.

The memory system 24 includes several different types of memory units. A read-only memory ("ROM") 39 storing instructions that form an operating system is often part of the memory system 24. Magnetic disc or other mass data storage systems 40 for nonvolatile storage of information that may be altered are also often part of the memory system 24. Mass data storage systems 40 are well adapted for storage and retrieval of large amounts of data, but are too slow to permit their effective usage in many applications. Dynamic random access memories ("DRAM") 42 allow much more rapid storage and retrieval of data and are frequently used as "system memory" 38 in which data and instructions are temporarily stored. However, DRAMs used as system memory 38 generally do not have access times that allow the processor 22 to operate at full speed. For example, a DRAM 42 may have a data access time on the order of 100 nanoseconds, while the processor 22 may be able to operate with a clock speed of several hundred megahertz. As a result, the processor 22 has to wait for many clock cycles before a request for data retrieval can be fulfilled by the DRAM 42.

For these reasons, and also because the data that the processor 22 needs most frequently often is a limited subset of the data stored in the DRAMs 42, a limited amount of high speed memory, known as a cache memory 44, is typically also included in the system memory 38. The cache memory 44 is more expensive and consumes more power than the DRAMs 42, but the cache memory 44 is also markedly faster. Typical cache memories 44 use static random access memories ("SRAM") having data access times on the order of 10 nanoseconds or less. As a result of including the cache memory 44, the entire computer 20 operates much more rapidly than is possible without the cache memory 44. Cache memories 44 of different types and using different information exchange and storage protocols have been developed to try to optimize performance of the computer 20 for different applications.

One often-encountered problem occurs when the processor 22 accesses the cache memory 44 through the system bus 26. No other portion of the computer 20 may then use the system bus 26 to transfer data. As a result, the computer 20 is unable to carry out many other kinds of operations while the system bus 26 is transferring data between the cache memory 44 and the processor 22.

A first solution to this problem is to include a cache memory (not illustrated) in the processor 22 itself. This form of cache memory is also known as "L1" or level one cache memory. However, having a fixed size of L1 cache memory in the processor 22 does not allow the size of the L1 cache memory to be optimized for a particular type of computer 20.

A second solution to this problem is to include a cache memory (not illustrated) between the processor 22 and the system bus 26. This form of cache memory is known as a "look through" cache memory.

With any form of cache memory 44, data stored in the cache memory 44 also corresponds to data stored in the DRAMs 42. When the contents of the cache memory 44 or the DRAMs 42 are updated, corresponding data in the other of the cache memory 44 or the DRAMs 42 will differ from the updated data, but these data still need to correspond to each other. As a result, writing data to either the cache memory 44 or the DRAMs 42 necessitates either updating corresponding data stored in the other of the cache memory 44 or the DRAMs 42, or keeping track of invalid (out of date or stale) data stored in the other of the cache memory 44 or the DRAMs 42. Attempting to read data from system memory 38 that is not stored in the cache memory 44 is known as a "read miss," while attempting to read data from the system memory 38 that is stored in the cache memory 44 is known as a "read hit." In a read hit, data is read from the cache memory, thus allowing the microprocessor 22 to read data significantly faster than in a read miss, in which the data must be read from the DRAM 42. Attempting to overwrite updated information in the cache memory 44 before the corresponding data in the DRAM 42 can be updated is known as a "write miss," and correctly writing new data to the cache memory 44 is known as a "write hit."

One method for tracking data stored in the cache memory 44 is to use a tag memory 46. The tag memory 46 uses the low order address bits for a memory address to access high order address bits of the cache memory 44 that are stored in the tag memory 46. The stored address bits from the tag memory 46 are also compared to the high order address bits of the memory address. In the event of a match, a cache hit is indicated, and the read data is thus read from the cache memory 44. The tag memory 46 may also store data characterizing each storage location in the cache memory 44. One protocol for characterizing data stored in the cache memory 44 and DRAMs 42 ("snooping" the memories) is known as "MESI," which is an acronym formed from Modified, Exclusive, Shared or Invalid. This protocol requires only two additional bits to be stored together with the high address bits in the tag memory 46. MESI allows ready determination of whether the data stored in the cache memory 44 have been modified, are exclusively stored in the cache memory 44, have been shared with the DRAMs 42 or are no longer valid data.

In order for the data from the tag memory 46 to be checked to determine when the data stored in the cache memory 44 is current, the data stored in the tag memory 46 must be transferred to the processor 22 in a procedure known as "snooping." This snooping procedure requires that the system bus 26 be occupied during the time that the data are being accessed and transferred from the tag memory 46 to the processor 22. While data are being transferred on the system bus 26, the system bus 26 is not available for other operations, again reducing data bandwidth, i.e., inhibiting other operation of the computer 20 for one or more clock cycles. As a result, the computer 20 cannot operate as rapidly as might otherwise be possible.

Therefore, there is a need for methods and systems whereby tag memory contents may be accessed by the processor without interfering with operation of at least some other portions of the computer.

SUMMARY OF THE INVENTION

In one aspect, the present invention includes a microprocessor having a system bus for exchanging data with a system memory, and a private bus for allowing the microprocessor to access a cache memory without using at least part of the system bus. The microprocessor reads data from, and writes data to, the cache memory through the private bus. Cache memory operations thus do not require use of the system bus, allowing other portions of the computer system to continue to function through the system bus.

According to another aspect of the invention, the address bus portion of the system bus is used to address the tag memory during the time that a bust transfer of data is occurring from either the system memory of the cache memory. It is possible to use the address bus in this manner because the address bus is normally idle during a burst data transfer. When addressed during a burst data transfer, the tag memory transfers tag data to the microprocessor through a dedicated tag data bus. The microprocessor is thus able to carry out tag snoops while cache data transfers are occurring. As a result, data transfer capability between the cache memory system and the microprocessor is not compromised by tag snoops.

DETAILED DESCRIPTION OF THE INVENTION

Figure 2:
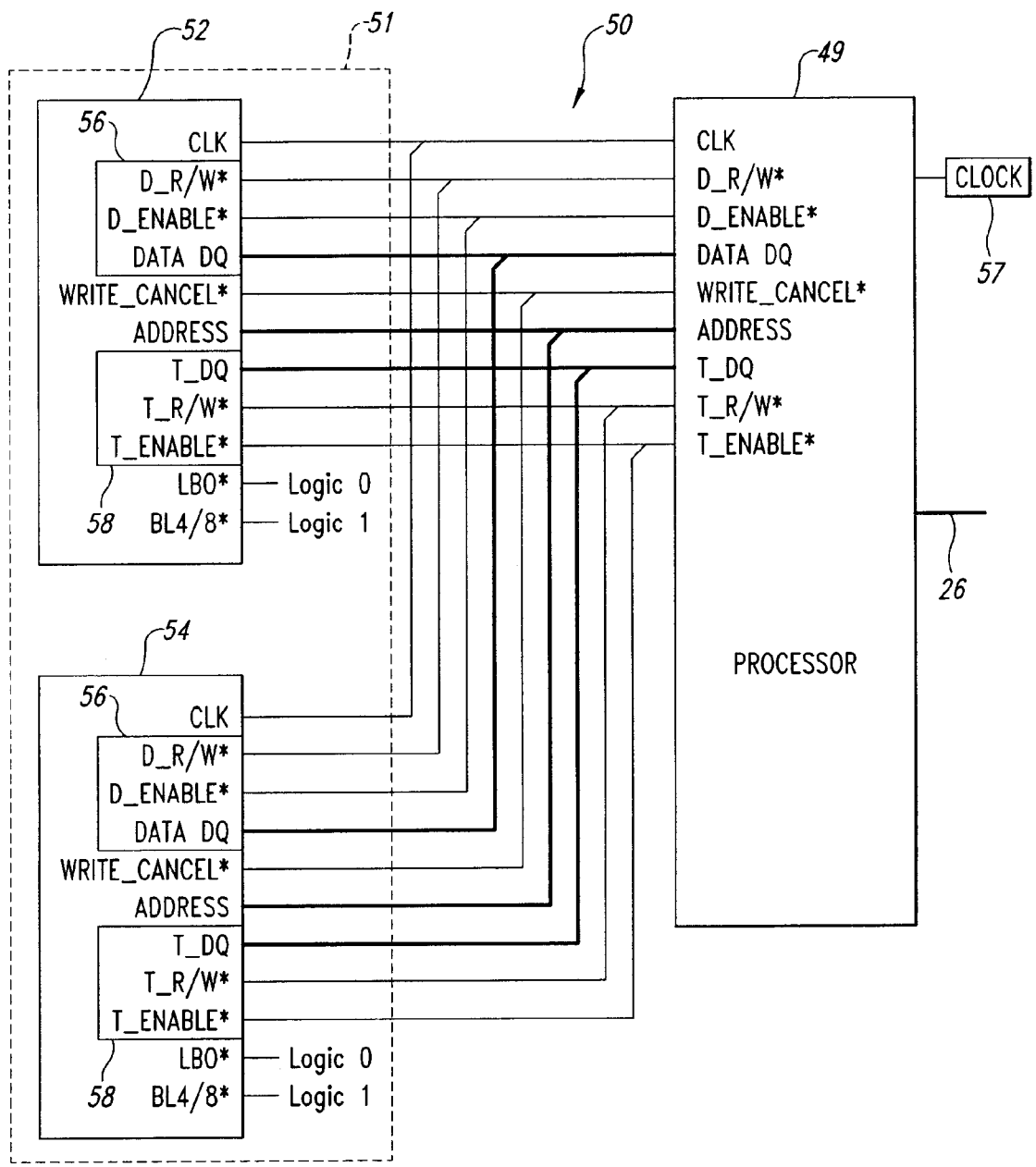
FIG. 2 is a simplified block diagram of a processor 49 with a private bus 50 coupled to a cache memory system 51, in accordance with an embodiment of the present invention. In one embodiment, the cache memory system 51 is formed from two cache SRAMs 52 and 54. A clock 57 supplies clock signals CLK to the processor 49 and to the cache SRAMs 52 and 54. In one embodiment, the cache memory system 51 is formed as a single integrated circuit or as a matched set of integrated circuits each including a data portion 56 and a tag portion 58, as described in co-pending U.S. patent application Ser. No. 08/68 1,674, filed on Jul. 29, 1996, now U.S. Pat. No. 5,905,996 and which is owned by the same entity as this application.

FIG. 2 is a simplified block diagram of a processor 49 with a private bus 50 coupled to a cache memory system 51, in accordance with an embodiment of the present invention. In one embodiment, the cache memory system 51 is formed from two cache SRAMs 52 and 54. A clock 57 supplies clock signals CLK to the processor 49 and to the cache SRAMs 52 and 54. In one embodiment, the cache memory system 51 is formed as a single integrated circuit or as a matched set of integrated circuits each including a data portion 56 and a tag portion 58, as described in co-pending U.S. patent application Ser. No. 08/681,674, filed on Jul. 29, 1996 and which is owned by the same entity as this application.

Figure 1:
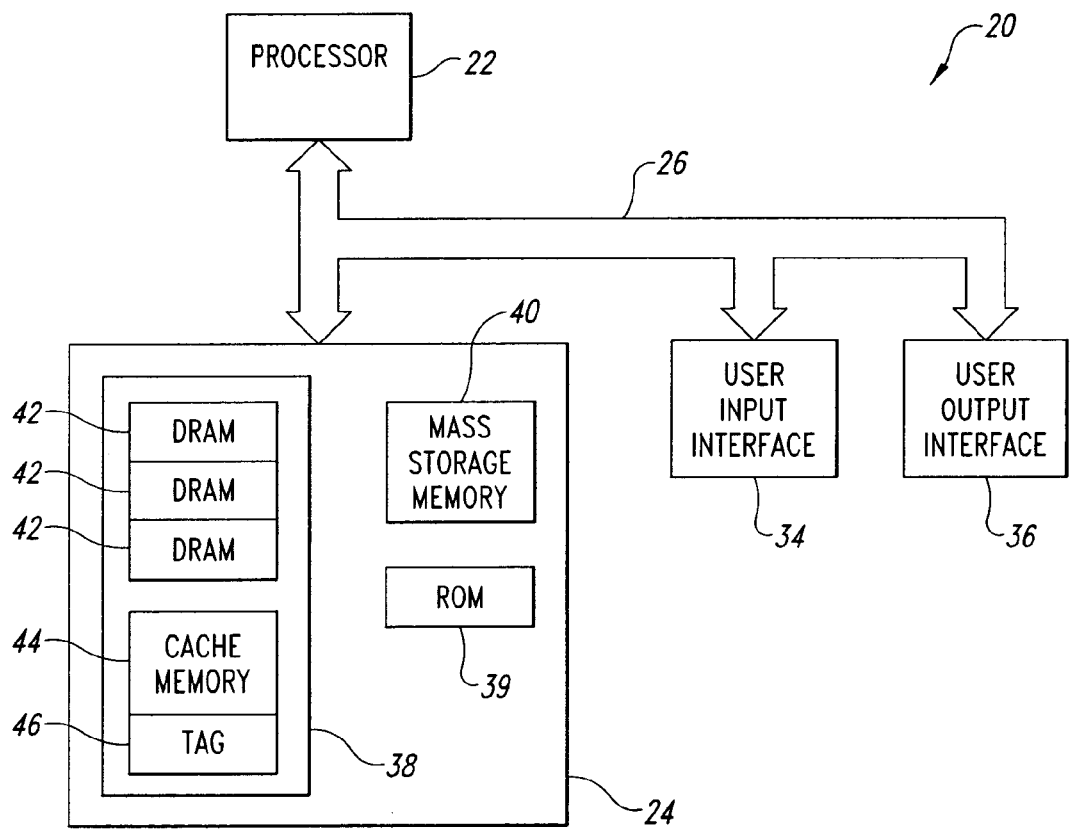
FIG. 1 is a simplified block diagram of a processor and external cache system, in accordance with the prior art.

The private bus 50 allows the processor 49 to write data to or read data from the cache memory system 51 without using the system bus 26. As a result, the rest of the computer system 20 of FIG. 1 is free to carry out other kinds of operations that require use of the system bus 26 during cache memory system 51 read and write operations, and the computer system 20 is able to operate more rapidly without requiring a higher clock signal frequency. However, it is also possible for the lines of the private bus 50 that are not coupled to the tag portion 58 to be shared with similar lines of the system bus 26.

In operation, the processor 49 and the cache memory system 51 interact by exchanging signals over the private bus 50, including a data read-write signal D_R/W* that determines whether a data access will be a read or a write, a data enable signal D_ENABLE* that enables the SRAMs 52, 54 to transfer data, data signals DATA DQ, a write cancel command WRITE_CANCEL* that terminates a write operation already in progress, address signals ADDRESS, tag data signals T_DQ, a tag read-write signal T_R/W*, a tag enable signal T_ENABLE*, a linear burst order signal LBO* and a burst length select signal BL4/8*, with the "*" designating the signal as active low or complement. These signals and the operation of the processor 49 and the cache memory system 51 are discussed below in more detail with reference to FIGS. 3 through 5.

Figure 3A:
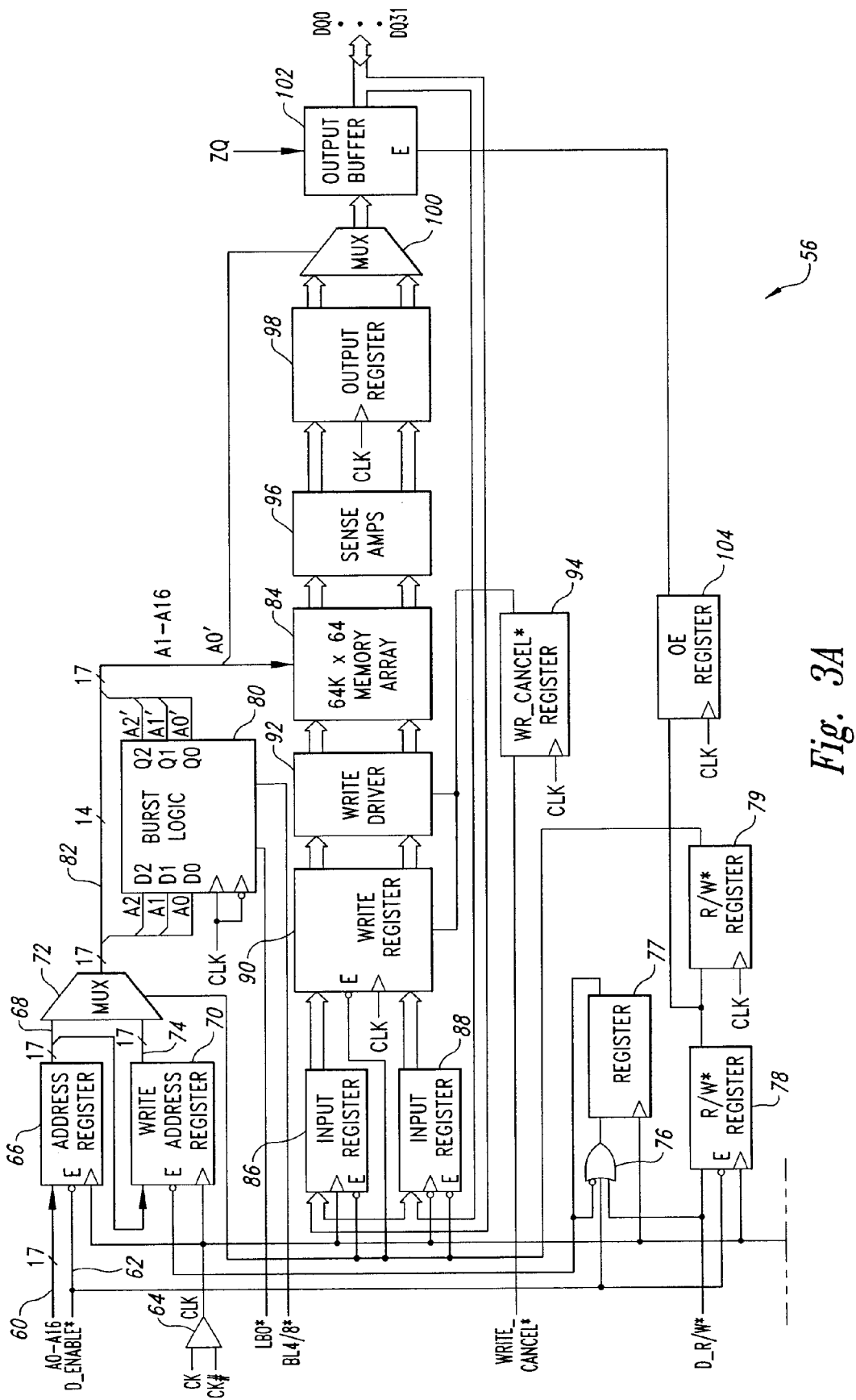
FIGS. 3A and 3B in combination provide a simplified block diagram of an SRAM for the cache memory system of FIG. 2, in accordance with an embodiment of the present invention.
Figure 3B:
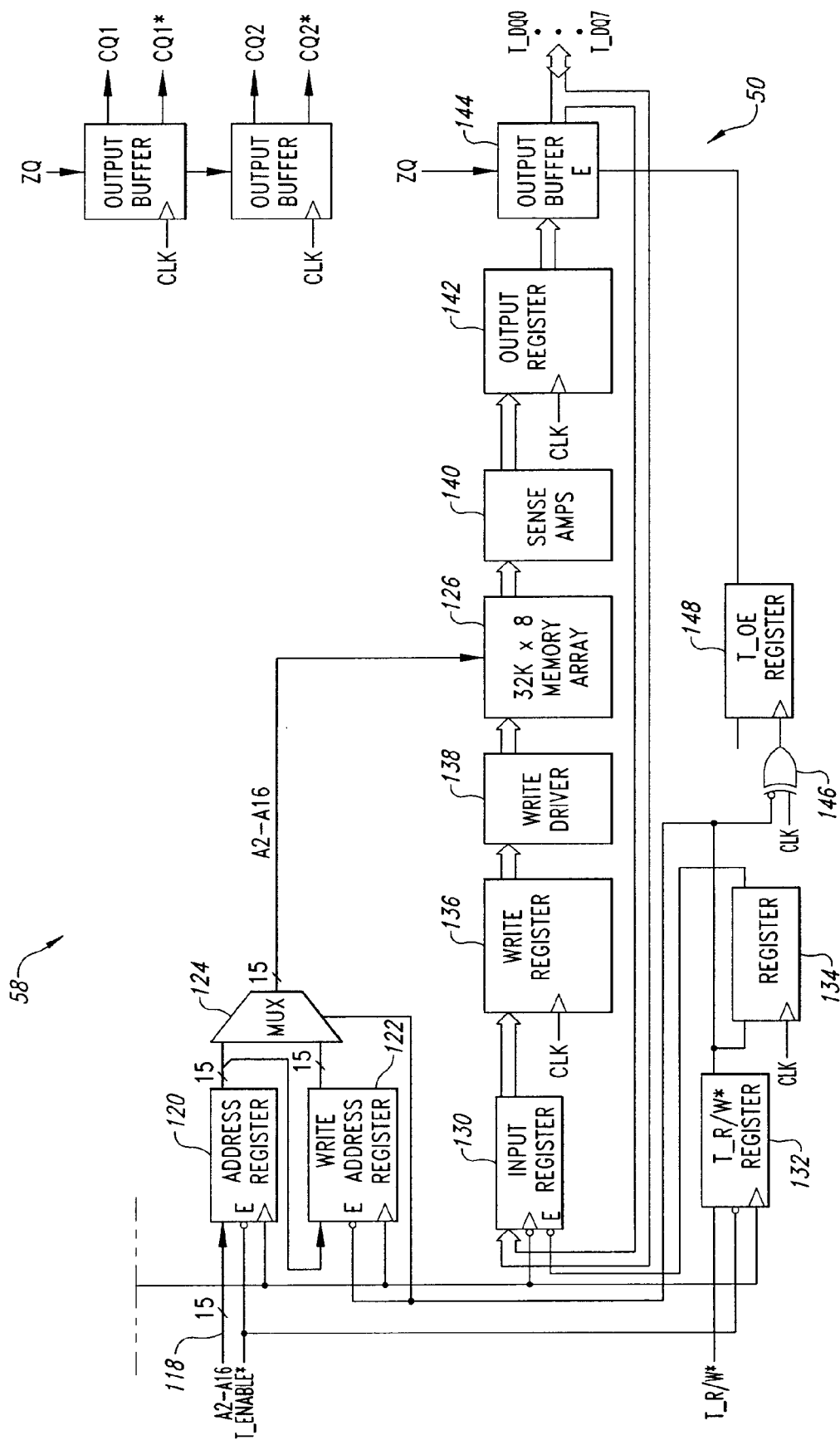

FIGS. 3A and 3B in combination provide a simplified block diagram of the cache SRAMs 52 or 54 for the cache memory system 51 of FIG. 2, in accordance with an embodiment of the present invention. The data portions 56 of the cache SRAMs 52 or 54 are shown in FIG. 3A and include an address bus 60, which is shown as a 17 bit address bus in FIG. 3, but which may include more or fewer bits. The address bus 60, the data enable signal D_ENABLE* coupled through a signal line 62, and the clock signal CLK from a clock buffer 64 are all coupled to an address register 66. When enabled, the address register 66 stores the address of data that will be read from or written to the cache SRAMs 52, 54 responsive to each CLK signal. The address register 66 is enabled by an active low D_ENABLE* signal.

An output bus 68 is coupled from an output of the address register 66 to an input of a data write address register 70 and to a first input of a multiplexer ("MUX") 72. A second input to the MUX 72 is coupled to an output bus 74 from the write address register 70. The MUX 72 is controlled by a signal from a read-write R/W* register 79 to couple the output of the address register 66 to the output of the MUX 72 in a read operation, and to couple the output of the write address register 70 to the output of the MUX 72 in a write operation. When enabled, the data write address register 70 latches the output of the address register 66 responsive to each CLK signal. The data write address register 70 is enabled by a low logic level at the output of a register 77. The register 77 latches the output of an OR gate 76 responsive to each CLK signal. The OR gate 76 is enabled by an active low D_ENABLE* signal and a low D_R/W* signal indicative of a write operation. When enabled, the OR gate 76 causes the output of the register 77 to toggle responsive to each CLK pulse since the output of the register 77 is coupled to an inverting input of the OR gate 76.

A burst counter 80 is coupled to the lower three bits of an address bus 82 that couples read and write addresses from the data row and column decoder 72 to a data memory array 84. The burst counter 80 also is coupled to the clock signal CLK from the clock buffer 64, to the burst length signal BL4/8* and to the burst order signal LBO*. The burst length signal BL4/8* sets the burst length to four when it is logic "1" and to eight when it is logic "0." The burst order signal LBO* sets the burst order to either a linear burst mode when it is logic "0" or to an interleaved burst mode when it is logic "1." In the interleaved mode, the least significant bit is alternated, then the next least significant bit followed by the least significant bit etc. Data burst orders for these two burst modes are summarized below in Table I.

TABLE I

BURST ORDER FOR LINEAR AND INTERLEAVED MODES.

| MODE | LENGTH | START | SEQUENCE |
| --- | --- | --- | --- |
| LINEAR | 4 | 0 | 0, 1, 2, 3 |
| LINEAR | 4 | 3 | 3, 0, 1, 2 |
| LINEAR | 8 | 0 | 0, 1, 2, 3, 4, 5, 6, 7 |
| LINEAR | 8 | 3 | 3, 4, 5, 6, 7, 0, 1, 2 |
| INTERLEAVED | 4 | 0 | 0, 1, 2, 3 |
| INTERLEAVED | 4 | 3 | 3, 2, 1, 0 |
| INTERLEAVED | 8 | 0 | 0, 1, 2, 3, 4, 5, 6, 7 |
| INTERLEAVED | 8 | 3 | 3, 2, 1, 0, 7, 6, 5, 4 |

Input data may be coupled from data bus terminals DQ0 . . . DQ31 of the private bus 50 to input registers 86 and 88. The input registers 86 and 88 latch the input data responsive to each CLK pulse when they are enabled by a low at the output of the R/W* register 79. It will be recalled that the output of the R/W* register 79 is also used to control the operation of the MUX 72. A write register 90 clocks the data from the input registers 86, 88 responsive to each CLK signal when it is enabled by a low at the output of the R/W* register indicative of a write operation. Thus, the write register 90 is enabled at the same time as the input registers 86, 88. The outputs of the write register 90 are coupled to a write driver 92 which, in turn, apply the data to a data memory array 84. Significantly, the write register 90 and the write driver 92 have reset inputs that are coupled to the WRITE_CANCEL* signal from the private bus 50 through a write cancel register 94. The write cancel register 94 latches the WRITE_CANCEL* signal responsive to each CLK signal. The significance of the WRITE_CANCEL* signal will be described below in connection with FIG. 5.

The data stored in the memory array 84 is read by coupling an address through the address register 66 and the MUX 72 to the data memory array 84 to select memory locations to be read. Sense amplifiers 96 supply the data from the data memory array 84 to a data output register 98. A multiplexer MUX 100 couples the data from an output of the data output register 98 to a data output buffer 102 that, in turn, is coupled to the data bus terminals DQ0 . . . DQ31 of the private bus 50. The data output buffer 102 is enabled by coupling the data read-write signal D_R/W* through the data read-write register 78 and an output enable register 104.

The tag portions 58 are shown in FIG. 3B and include an address bus 118 coupled to a tag address register 120 that latches an address from the address bus 118 responsive to each CLK pulse when enabled by an active low T_ENABLE* signal. The output of the address register 120 is applied to one input of a MUX 124 and an input of a write address register 122. The write address register 122 similarly latches its input responsive to each CLK pulse when enabled by a low at the output of a tag read/write T_R/W* register 132 indicative of a write operation. The T_R/W* register 132 latches the T_R/W* input responsive to the CLK signal when enabled by a low T_ENABLE* signal. The output of the T_R/W* register 132 also controls the operation of the MUX 124 to couple the output of the T_R/W* register 132 to the output of the MUX 124 whenever the T_R/W* register 132 is enabled. The output of the MUX 124 is used to address a tag memory array 126.

Input tag data from the private bus 50 are coupled through tag data bus terminals T_DQ0 . . . T_DQ7 to a tag input register 130. The input tag data is latched in the input register 130 responsive to the CLK signal when the input register 130 is enabled by a low at the output of a register 134. The register 134 latches the output of the T_R/W* register 132 responsive to the CLK signal, and the T_R/W* register 132 latches the tag read/write T_R/W* input when enabled by a low T_ENABLE* input.

The input tag data at the output of the input register 130 are coupled through a tag write register 136 responsive to the CLK signal and to a tag write driver 138. The tag write driver 138 applies in input tag data to the tag memory array 126 in a fashion similar to analogous operations in the data portion 56.

In a tag read operation, tag data from the tag memory array 126 are coupled through sense amplifiers 140, a tag output register 142 and a tag output buffer 144 to the tag data bus terminals T_DQ0 . . . T_DQ7. The tag output buffer 144 is enabled by an output from a tag output enable T_OE register 148, which had a high logic level that is applied to its input coupling to its output responsive to each transition at the output of an exclusive-OR gate 146. The exclusive-OR gate 149 receives the output of the T_R/W* register 132 and the CLK signal and thus clocks the T_OE register 148 on one phase of the CLK signal in a read operation and the other phase of the CLK signal in a write operation.

Figure 4:
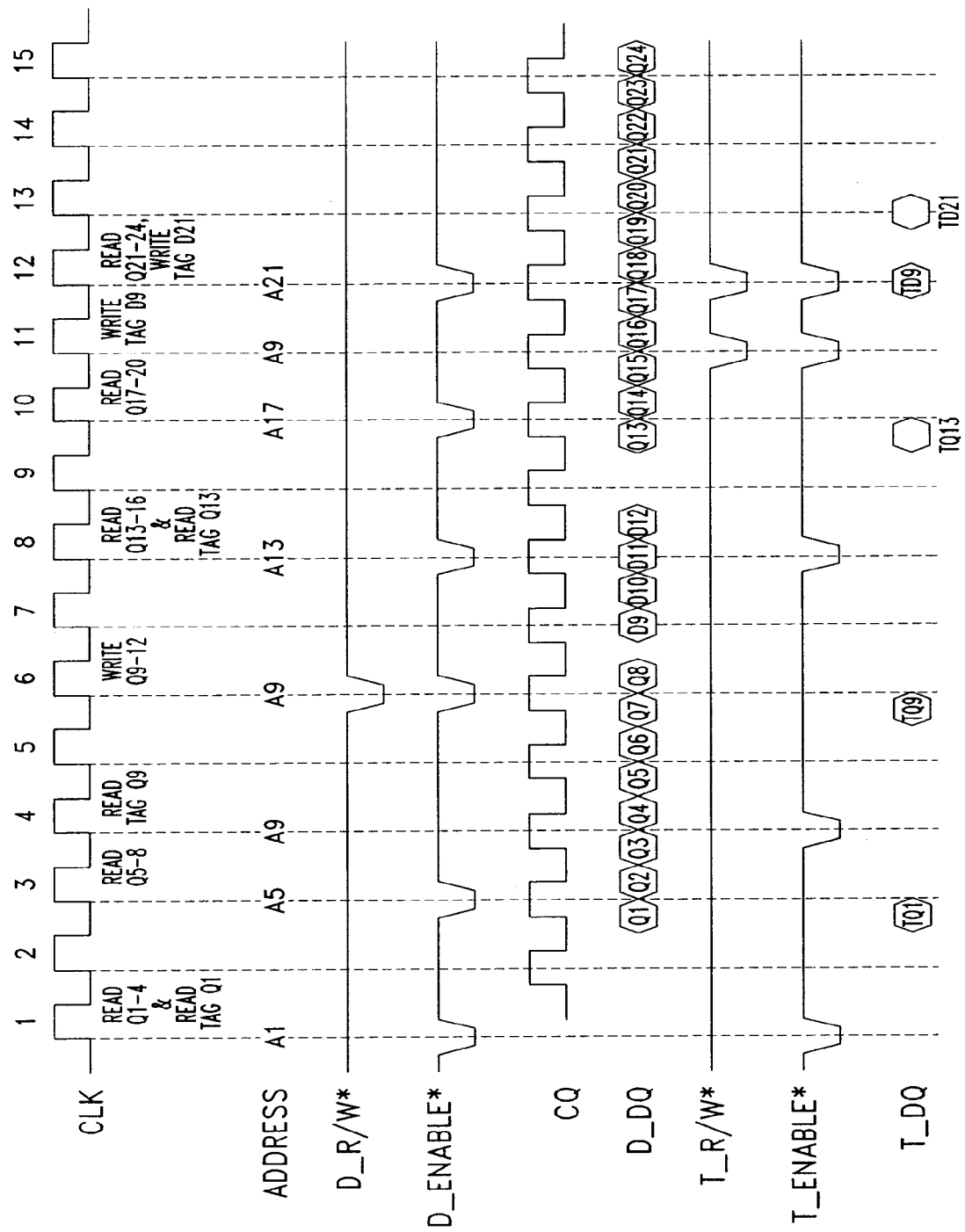
FIG. 4 is a simplified timing diagram illustrating relationships between signals in the cache memory system of FIGS. 2 and 3.
Figure 5:
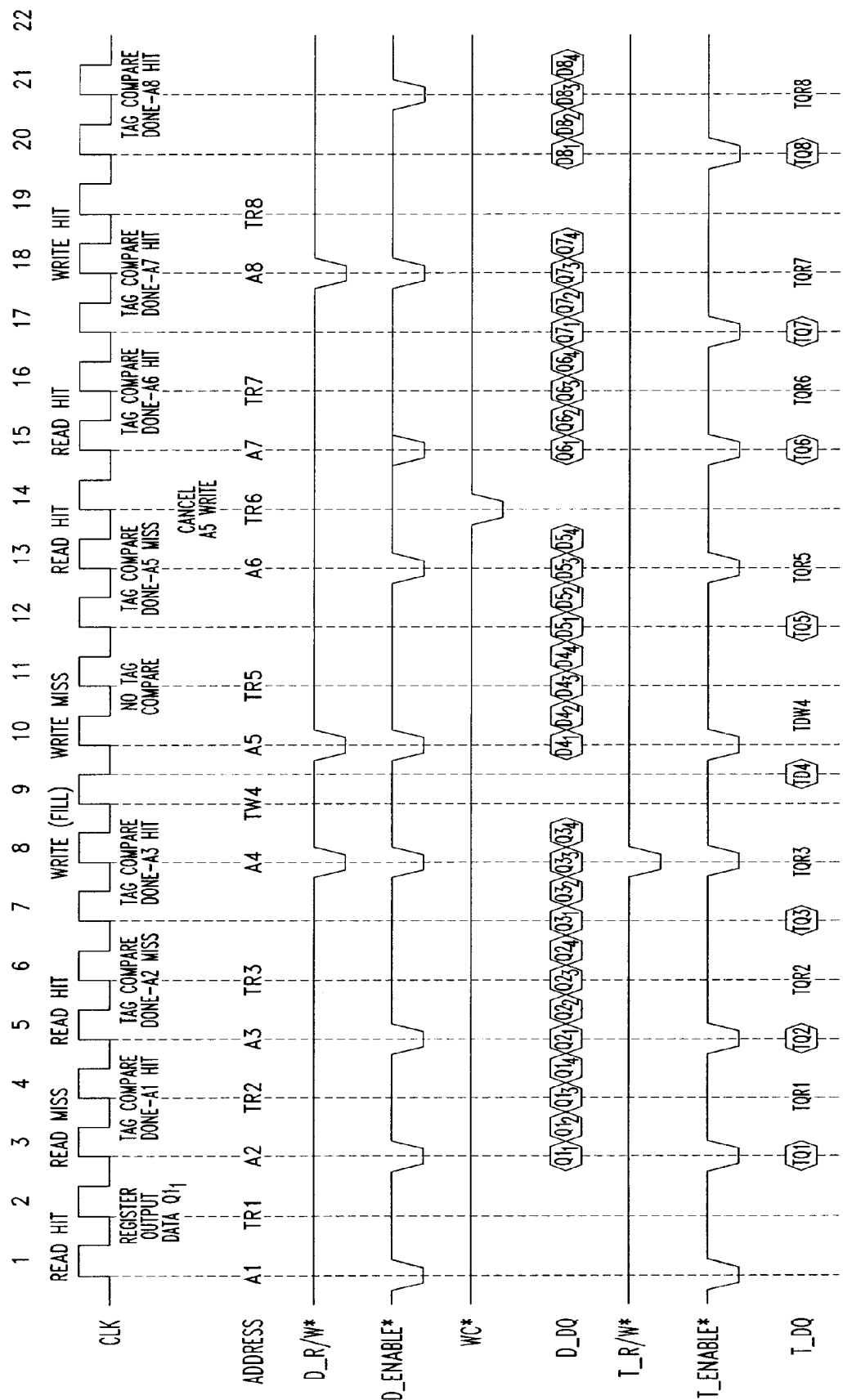
FIG. 5 is a simplified timing diagram illustrating relationships between signals for read and write hit and miss scenarios, in accordance with an embodiment of the present invention.

FIG. 4 is a simplified timing diagram illustrating relationships between signals in the cache memory system 51 of FIGS. 2 and 3, and FIG. 5 is a simplified timing diagram illustrating relationships between signals for read and write hit and miss scenarios, in accordance with an embodiment of the present invention. The clock signal CLK illustrated at the top of the timing diagrams synchronizes operations between the processor 49 and the cache memory system 51 as well as operations internal to both the processor 49 and the cache memory system 51. Addresses ADDRESS present on the address bus 60 and tag address bus 118 of FIG. 3 are represented below the clock signal CLK. Four data signals, the data read-write signal D_R/W*, the data enable signal D_ENABLE*, a quadrature clock signal CQ (FIG. 4) or a write cancel signal WC* (FIG. 5) and input/output data signals D_DQ, are illustrated below the address signals ADDRESS. Three tag signals, the tag read-write signal T_R/W*, the tag enable signal T_ENABLE* and the tag input/output data T_DQ, are illustrated below the four data signals.

A tag read and linear burst data read sequence is illustrated at the left of FIG. 4. A first address A1 is sent from the processor 49 of FIG. 2 to the cache memory system 51 through the private bus 50 on a rising edge of a first clock pulse. Both the data enable D_ENABLE* and tag enable T_ENABLE* signals go active low in conjunction with this clock edge, strobing the address A1 into the data and tag address registers 66 and 120 of FIG. 3. While not shown in FIG. 4, the burst length signal BL4/8* is set to logic "1" by the processor 49 of FIG. 2, setting the burst length to four, and the burst order signal LBO* is set to logic "0", setting the burst order to the linear burst mode.

Starting at a falling edge of a second clock pulse, cache data Q1 through Q4 from four cache memory locations are read through the data bus terminals DQ0 . . . DQ31 beginning at the address A1. Tag data TQ1 corresponding to the first address A1 is also read through the tag data bus terminals T_DQ0 . . . T_DQ7. (As used herein, signals designated by "Q" represent output data, signals designated by "D" represent input data, and signals designated by "T" represent tag data). At the rising edge of a third clock pulse, address A5 is present on the private bus 50 and is strobed into the data address register 66 by a second data enable signal D_ENABLE*. A second group of cache data Q5 through Q8 are read through the data bus terminals DQ0 . . . DQ31 from four cache memory locations starting at address A5 during the next two clock pulses.

A cache snoop follows the tag read sequence. At the rising edge of a fourth clock pulse, the processor 49 of FIG. 2 applies the address A9 to the private bus 50 and sets the tag enable signal T_ENABLE* low to read tag data TQ9 at the tag memory location A9. At the rising edge of a sixth clock pulse, the address A9 is applied to the private bus 50 and is strobed into the data address register 66 of FIG. 3 by setting the signals data read-write D_R/W* and data enable D_ENABLE* low. Starting with the rising edge of a seventh clock pulse, cache data D9 through D12 intended to be written the cache memory system 51 at four consecutive locations starting at address A9 are coupled to the cache memory system 51 through the data bus terminals DQ0 . . . DQ31. The processor 49 determines from the tag TQ9 (e.g., using MESI) that this is a write hit while the cache data D9 through D12 is still being written to the cache memory system 51.

A cache read and cache snoop are shown next. At the rising edge of an eighth clock pulse, an address A13 is applied to the private bus 50 by the processor 49 and the data enable signal $D_{13}$ ENABLE* and tag enable T_ENABLE* signals are set to logic "0," strobing the address A13 into the data and tag address registers 66 and 120. The processor 49 reads cache data Q13 through Q17 from the next four addresses beginning with A13 and the tag data TQ13 for the address A13 during ninth through eleventh clock pulses. The processor 49 determines from the tag data TQ13 that this is a read hit, e.g., using MESI, while the cache data Q13 . . . Q16 are being read. The address A17 is strobed into the data address register 66 on the rising edge of a tenth clock pulse and data from addresses A17 through A20 are read out during eleventh through thirteenth clock pulses.

New tag data TD9 are written to the tag portions 58 of the cache SRAMs 52 and 54 next. On the rising edge of the eleventh clock pulse, tag data are written to the tag portion 58 by strobing the address A9 into the tag address register 120 and setting the tag enable signal T_ENABLE* low. The tag read-write signal T_R/W* is also set low to indicate a write operation. The tag data D9 is then written to the tag portions 58 of the cache SRAMs 52 and 54 on the rising edge of a twelfth clock pulse.

At the rising edge of the twelfth clock pulse, an address A21 is applied to the private bus 50 by the processor 49 and the data enable signal D_ENABLE* and tag enable T_ENABLE* signals are set to logic "0," strobing the address A21 into the data and tag address registers 66 and 120. The processor 49 reads cache data Q21 through Q24 from the next four addresses beginning with A21. Since the T_R/W* line is set low with the assertion of the address A21, and tag data TD21 is written to the tag portion 58 on the rising edge of the thirteenth clock pulse.

It is important to note that the writing of tag data to and the reading of tag data from the tag portion 58 of the of the cache SRAMs 52 and 54 does not interfere with or otherwise slow down the writing of cache data to or the reading of cache data from the data portion of the SRAMs 52 and 54. This is because the tag portion 58 has its own data bus and control bus (which transfer the control signals T_R/W* and T_ENABLE*), and the address bus, although shared by the data portion 56 and the tag portion 58, is either simultaneously addresses the data portion 56 and the tag portion 58 or addresses only the tag portion 56 during a burst transfer when addresses need not be applied to the data portion 56.

Multiple tag snoops, executed without compromising data transaction capability through the system bus 26 of FIGS. 1 and 2, are is illustrated in FIG. 5. A sequence of signals associated with a read hit is shown at the left hand edge of FIG. 5. Addresses A1, A2 and A3 are strobed into address registers 66 and 120 of FIG. 3 by setting the signals D_ENABLE* and T_ENABLE* low on the rising edges of first, third and fifth clock cycles, respectively. Tag data TQ1 and cache data $Q1_1$ through $Q1_4$ are read during the third and fourth clock cycles, tag data TQ2 and cache data $Q2_1$ through $Q2_4$ are read during fifth and sixth clock cycles and tag data TQ3 and cache data $Q3_1$ through $Q3_4$ are read during seventh and eighth clock cycles, respectively. The processor 49 (FIG. 2) can identify tag hits using the MESI protocol on the first tag data TQ1 and third tag data TQ3 on rising edges of fourth and eighth clock pulses, respectively, and can identify a tag miss using second tag data TQ2 on the rising edge of the sixth clock pulse. Because the processor 49 has identified the cache data $Q2_1$ through $Q2_4$ as a read miss, these cache data are ignored by the processor 49.

On the rising edge of the eighth clock pulse, write commands are strobed into the cache read-write register 78 and the tag read-write register 132 by the D_R/W* and T_R/W* signals, respectively, and the address A4 is strobed into the address registers 66 and 132 by setting the signals D_ENABLE* and T_ENABLE* low at the same time. The tag data TD4 for the write are strobed into the tag portion 58 on the falling edge of the ninth clock pulse.

On the rising edge of the tenth clock pulse, write commands are strobed into the cache read-write register 78 and the tag read-write register 132 by the D_R/W* and T_R/W* signals, respectively, and the address A5 is strobed into the address registers 66 and 132 by setting the signals D_ENABLE* and T_ENABLE* low at the same time. Cache data $D4_1$ through $D4_4$ are clocked into the input registers 86 and 88 during the tenth and eleventh clock pulses and cache data $D5_1$ through $D5_4$ are clocked into the input registers 86 and 88 during the twelfth and thirteenth clock pulses.

The tag data TQ5 is read from the T_DQ bus on the rising edge of the twelfth clock pulse and the processor 49 determines, on the rising edge of the thirteenth clock pulse, that the cache data locations $D5_1$ through $D5_4$ contain data that has not yet been written to the DRAMs 42 (FIG. 1), i.e., that the data $D5_1$ through $D5_4$ contained in these locations would be lost if they were overwritten with the data $D5_1$ through $D5_4$ that is being read into the input registers 86 and 88, the write register 90 and the write driver 92. As a result, the processor 49 sends a write cancel signal WC* to the cache memories 52 and 54 on the rising edge of the fourteenth clock pulse to strobe the write cancel register 94 and thereby reset the write register 90 and the write driver 92, preventing the previously-stored cache data $D5_1$ through $D5_4$ from being overwritten.

On rising edges of the thirteenth and fifteenth clock pulses, the addresses A6 and A7, respectively, are strobed into the address registers 66 and 132 by setting the signals D_ENABLE* and T_ENABLE* low at the same time. Cache data $D6_1$ through $D6_4$ and $D7_1$ through $D7_4$ and tag data TQ6 and TQ7 are read from the cache memories 52 and 54 during the fifteenth through eighteenth clock pulses. The processor 49 determines that the cache data $D6_1$ through $D6_4$ represent a read hit on the rising edge of the sixteenth clock pulse and that the cache data $D7_1$ through $D7_4$ represent a read hit on the rising edge of the eighteenth clock pulse.

On the rising edge of the eighteenth clock pulse, the address A8 is strobed into the address register 66 by setting the signal $D_{13}$ ENABLE* low. A write cycle is initiated by setting the signal D_R/W* low at the same time. The data $D8_1$ through $D8_4$ are written to the input registers 86 and 88 during the twentieth and twenty-first clock cycles, and the tag data TQ8 is read from the tag portion 58 on the rising edge of the twentieth clock pulse. The processor 49 determines that the data $D8_1$ through $D8_4$ represent a write hit during the rising edge of the twenty-first clock pulse.

Also shown in FIG. 5 are sample cycles of additional tag transactions that could occur, but which are not part of the sequence described above. For instance, there is sufficient tag and address bus bandwidth to perform additional tag reads during clock cycles 2, 4, 6, 11, 14, 16, 19 and additional tag write cycles during clock cycle 9. This extra bandwidth is available for multiprocessor snoop and coherency operations.

Figure 6:
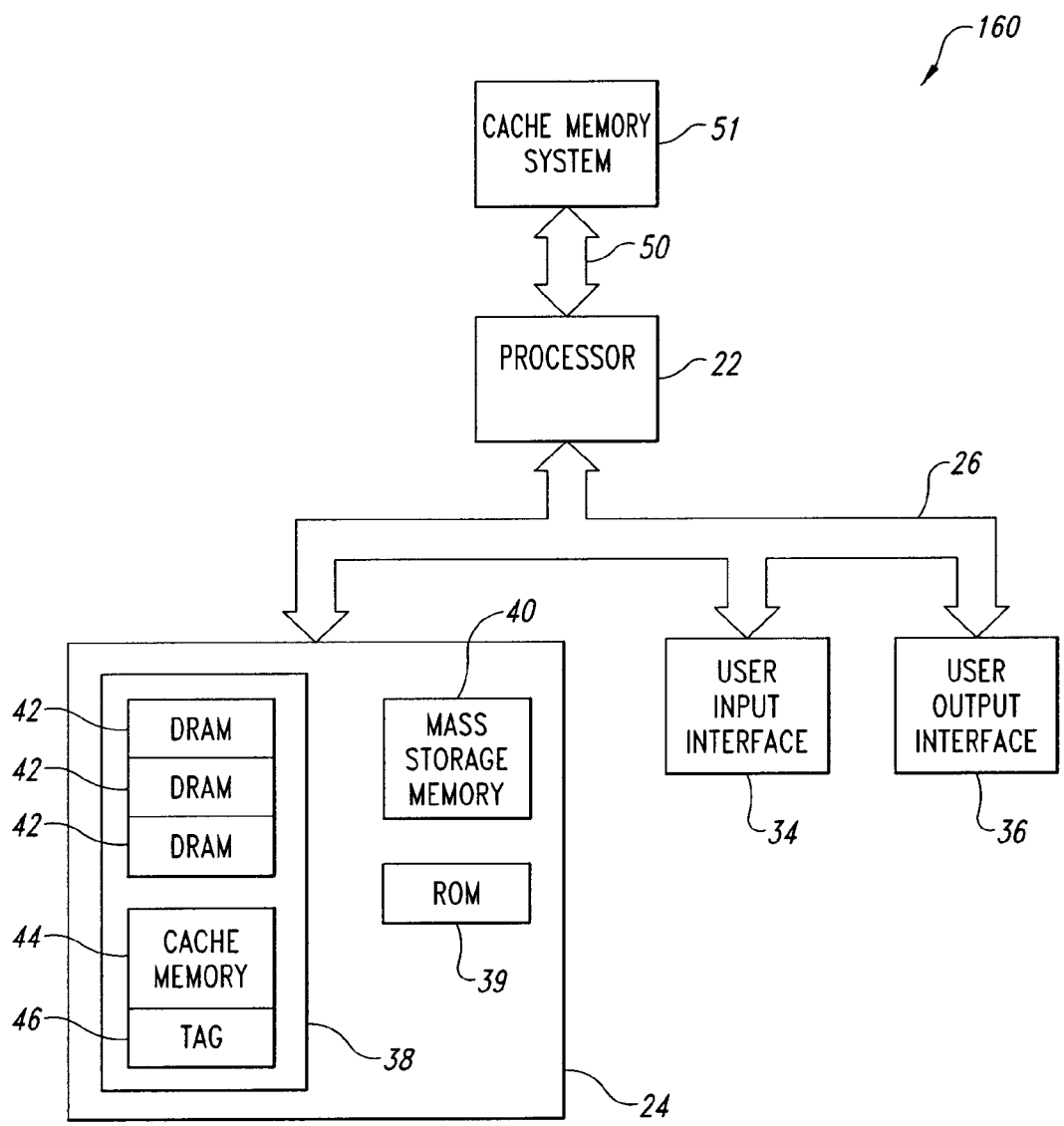
FIG. 6 is a simplified block diagram of a computer using the processor and cache memory system of FIGS. 2 and 3, in accordance with an embodiment of the present invention.

FIG. 6 is a simplified block diagram of a computer 160 using the processor 49 and cache memory system 51 of FIGS. 2 and 3, in accordance with an embodiment of the present invention. The computer 160 includes elements common to the computer 20 of FIG. 2, but incorporates the cache memory system 51 of FIGS. 2 and 3 and the modified processor 49 of FIG. 2 to provide increased operating speed. Forming a cache memory system 51 that may be optimized for a particular application allows flexibility in the design of the computer 160. Computers 160 find application in word processing systems, scientific and financial calculation systems, industrial control systems and myriad other applications where data are manipulated, collected, displayed, transmitted or stored.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer system, comprising:
   a processor having a system bus port and a private bus port;
   a system bus coupled to the system bus port of the processor;
   a private bus coupled to the private bus port of the processor, the private bus comprising a cache data bus, a cache control bus, a tag data bus, a tag control bus and an address bus;
   a system memory coupled to the system bus; and
   a cache memory coupled to the private bus, the cache memory comprising a cache data portion and a tag data portion, the cache data portion being coupled to the cache data bus, the cache control bus and the address bus, and the tag data portion being coupled to the tag data bus, the tag control bus, and the address bus.

2. The computer system of claim 1 wherein a portion of the system bus is coupled to the cache memory so that a portion of the system bus is shared by the system memory and the cache memory.

3. The computer system of claim 1, wherein the processor is structured to address the tag data portion during a burst transfer of cache data to or from the cache data portion.

4. The computer system of claim 1, wherein the processor is structured to transfer tag data to or from the tag data portion during a transfer of cache data to or from the cache data portion.

5. The computer system of claim 1 wherein the processor is structured to perform snoops of the cache memory during a transfer of data between the processor and the cache memory.

6. The computer system of claim 1 wherein the cache data portion comprises:
   an address register adapted to store an address applied to the cache data portion and to output from the address register an internal address;
   a burst counter coupled to an output of the address register, the burst counter being structured to increments the internal address responsive to a clock signal;
   a data input register coupled to receive and store cache data from the processor;
   a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array to apply cache data to the processor.

7. The computer system of claim 1 wherein the tag data portion comprises:
   an address register adapted to store an address applied to the tag data portion and to output from the address register an internal address;
   a data input register coupled to receive and store tag data from the processor;
   a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array to apply tag data to the processor.

8. A computer system, comprising:
   a processor having an address bus port, a cache data bus port, a cache control bus port, a tag data bus port, and a tag control bus port;
   an address bus coupled to the address bus port of the processor;

a cache data bus coupled to the cache data bus port of the processor;

a cache control bus coupled to the cache control bus port of the processor;

a tag data bus coupled to the tag data bus port of the processor;

tag control bus coupled to the tag control bus port of the processor; and a cache memory including a cache data portion and a tag data portion, the cache data portion having an address bus port coupled to the address bus, a cache data bus port coupled to the cache data bus, and a cache control bus port coupled to the cache control bus, and the tag data portion having a tag data bus port coupled to the tag data bus and tag control bus port coupled to the tag control bus, the processor being structured to address the tag data portion during a burst transfer of cache data to or from the cache data portion.

9. The computer system of claim 8, further comprising a system memory coupled to the processor through a system bus.

10. The computer system of claim 9 wherein the system bus is independent from busses connecting the processor to the cache memory.

11. The computer system of claim 9 wherein a portion of the system bus is coupled to the cache memory so that a portion of the system bus is shared by the system memory and the cache memory.

12. The computer system of claim 8, wherein the processor is structured to transfer tag data to or from the tag data portion during a transfer of cache data to or from the cache data portion.

13. The computer system of claim 8 wherein the processor is structured to perform snoops of the cache memory during a transfer of data between the processor and the cache memory.

14. The computer system of claim 8 wherein the cache data portion of the cache memory comprises:

an address register coupled to the address bus, the address register being adapted to store an address applied to the address bus and to output from the address register an internal address;

a burst counter coupled to an output of the address register, the burst counter being structured to increment the internal address responsive to a clock signal;

a data input register coupled to the cache data bus, the data input register being structured to receive and store cache data applied to the cache data bus;

a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array, the data output register being structured to apply cache data to the cache data bus.

15. The computer system of claim 8 wherein the tag data portion of the cache memory comprises:

an address register coupled to the address bus, the address register being adapted to store an address applied to the address bus and to output from the address register an internal address;

a data input register coupled to the tag data bus, the data input register being structured to receive and store tag data applied to the tag data bus;

a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array, the data output register being structured to apply tag data to the tag data bus.

16. The computer system of claim 8 wherein the processor is structured to perform snoops of the cache memory during a write of cache data from the processor to the cache memory, and wherein the processor is further structured to cancel the writing of cache data to the cache memory responsive to the snoop of the cache memory indicating a cache write miss.

17. A computer system comprising:

a processor having a processor bus;

an input device coupled to the processor through the processor bus and adapted to allow data to be entered into the computer system;

an output device coupled to the processor through the processor bus adapted to allow data to be output from the computer system;

a system memory coupled to the processor through the processor bus; and a cache memory system comprising:

a cache memory and a tag memory; and a private bus coupled to the processor, the cache memory and the tag memory for simultaneously exchanging tag data and cache data between the cache memory system and the processor, the private bus including a cache data bus coupled to the cache memory, a cache control bus coupled to the cache memory, a tag data bus coupled to the tag memory, a tag control bus coupled to the tag memory, and an address bus coupled to the cache memory and the tag memory.

18. The computer system of claim 17, further comprising means coupled to the processor for snooping the cache memory system during a burst transfer of data between the cache memory system and the processor, the snooping means operating during the burst transfer of data without interrupting the burst transfer of data.

19. The computer system of claim 17 further comprising burst mode length setting means coupled to the processor and to the cache memory system, the burst mode length setting means determining a length of data bursts exchanged between the processor and the cache memory system.

20. In a computer system, a method of snooping a cache memory system capable of storing tag data and cache data, and transferring cache data in a burst transfer mode, the method comprising:

addressing the cache memory to transfer cache data to or from the cache memory during a burst cache data transfer;

transferring a burst of cache data to or from the cache memory;

addressing the cache memory during the burst transfer to transfer tag data to or from the cache memory; and while the burst of cache data is being transferred from the cache memory, transferring tag data to or from the cache memory.

21. The method of claim 20 wherein the act of addressing the cache memory to transfer tag data to or from the cache memory comprises addressing the cache memory to transfer tag data to or from the cache memory when there is no need to address the cache memory to transfer cache data to or from the cache memory.

22. The method of claim 20 wherein the burst of cache data is transferred to the cache memory and the tag data is transferred from the cache memory, and wherein the method further comprises:

detecting from the tag data transferred from the cache memory whether there is a cache miss condition; and canceling the writing of the burst of cache data to the cache memory in the event the cache miss condition is detected.

23. A method for detecting a cache memory read miss comprising:

sending a first address from a processor to a cache memory;

sending a first tag read request from the processor to a tag memory associated with the cache memory;

sending a cache read request to read cache data from the first address;

reading first tag data from the first address in the tag memory;

determining in the processor from the first tag data, when the read request is a read miss while the cache memory is outputting cache read data in a burst; and ignoring the read data when the cache read request is a read miss.

24. The method of claim 23, further comprising setting a burst mode to provide one of several predetermined burst lengths of cache data.

25. The method of claim 23, further comprising:
determining when the read request is a read hit; and
accepting the read data when the read request is a read hit.

26. The method of claim 23 wherein the acts of sending a first address, sending a first tag read request and sending a cache read request comprise:

sending a first address from the processor to a cache memory;

sending a first tag read request from the processor to a tag memory associated with the cache memory; and sending a cache read request to read cache data from the first address.

27. A computer system, comprising:
a processor having a system bus port and a private bus port;
a system bus coupled to the system bus port of the processor;
a private bus coupled to the private bus port of the processor, the private bus comprising a cache data bus, a cache control bus, a tag data bus, a tag control bus and an address bus;
a system memory coupled to the system bus; and
a cache memory coupled to the private bus, the cache memory comprising a cache data portion and a tag data portion, the cache data portion being coupled to the cache data bus, the cache control bus and the address bus, and the tag data portion being coupled to the tag data bus and the tag control bus, the cache memory being coupled to a portion of the system bus so that a portion of the system bus is shared by the system memory and the cache memory.

28. The computer system of claim 27 wherein the processor is structured to address the tag data portion during a burst transfer of cache data to or from the cache data portion.

29. The computer system of claim 27 wherein the processor is structured to transfer tag data to or from the tag data portion during a transfer of cache data to or from the cache data portion.

30. The computer system of claim 27 wherein the processor is structured to perform snoops of the cache memory during a transfer of data between the processor and the cache memory.

31. The computer system of claim 27 wherein the cache data portion comprises:

an address register adapted to store an address applied to the cache data portion and to output from the address register an internal address;

a burst counter coupled to an output of the address register, the burst counter being structured to increments the internal address responsive to a clock signal;

a data input register coupled to receive and store cache data from the processor;

a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array to apply cache data to the processor.

32. The computer system of claim 27 wherein the tag data portion comprises:

an address register adapted to store an address applied to the tag data portion and to output from the address register an internal address;

a data input register coupled to receive and store tag data from the processor;

a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array to apply tag data to the processor.

33. A computer system, comprising:
a processor having a system bus port and a private bus port;
a system bus coupled to the system bus port of the processor;
a private bus coupled to the private bus port of the processor, the private bus comprising a cache data bus, a cache control bus, a tag data bus, a tag control bus and an address bus;
a system memory coupled to the system bus; and
a cache memory coupled to the private bus, the cache memory comprising a cache data portion and a tag data portion, the cache data portion being coupled to the cache data bus, the cache control bus and the address bus, and the tag data portion being coupled to the tag data bus, and the tag control bus, the processor being structured to address the tag data portion during a burst transfer of cache data to or from the cache data portion.

34. The computer system of claim 33 wherein the processor is structured to transfer tag data to or from the tag data portion during a transfer of cache data to or from the cache data portion.

35. The computer system of claim 33 wherein the processor is structured to perform snoops of the cache memory during a transfer of data between the processor and the cache memory.

36. The computer system of claim 33 wherein the cache data portion comprises:
   an address register adapted to store an address applied to the cache data portion and to output from the address register an internal address;
   a burst counter coupled to an output of the address register, the burst counter being structured to increments the internal address responsive to a clock signal;
   a data input register coupled to receive and store cache data from the processor;
   a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array to apply cache data to the processor.

37. The computer system of claim 33 wherein the tag data portion comprises:
   an address register adapted to store an address applied to the tag data portion and to output from the address register an internal address;
   a data input register coupled to receive and store tag data from the processor;
   a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array to apply tag data to the processor.

38. A computer system, comprising:
   a processor having an address bus port, a cache data bus port, a cache control bus port, a tag data bus port, and a tag control bus port;
   an address bus coupled to the address bus port of the processor;
   a cache data bus coupled to the cache data bus port of the processor;
   a cache control bus coupled to the cache control bus port of the processor;
   a tag data bus coupled to the tag data bus port of the processor;
   tag control bus coupled to the tag control bus port of the processor; and
   a cache memory including a cache data portion and a tag data portion, the cache data portion having an address bus port coupled to the address bus, a cache data bus port coupled to the cache data bus, and a cache control bus port coupled to the cache control bus, and the tag data portion having a tag data bus port coupled to the tag data bus and tag control bus port coupled to the tag control bus, a portion of the system bus being coupled to the cache memory so that a portion of the system bus is shared by the system memory and the cache memory.

39. The computer system of claim 38, further comprising a system memory coupled to the processor through a system bus.

40. The computer system of claim 38, wherein the processor is structured to transfer tag data to or from the tag data portion during a transfer of cache data to or from the cache data portion.

41. The computer system of claim 38 wherein the processor is structured to perform snoops of the cache memory during a transfer of data between the processor and the cache memory.

42. The computer system of claim 38 wherein the cache data portion of the cache memory comprises:
   an address register coupled to the address bus, the address register being adapted to store an address applied to the address bus and to output from the address register an internal address;
   a burst counter coupled to an output of the address register, the burst counter being structured to increment the internal address responsive to a clock signal;
   a data input register coupled to the cache data bus, the data input register being structured to receive and store cache data applied to the cache data bus;
   a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array, the data output register being structured to apply cache data to the cache data bus.

43. The computer system of claim 38 wherein the tag data portion of the cache memory comprises:
   an address register coupled to the address bus, the address register being adapted to store an address applied to the address bus and to output from the address register an internal address;
   a data input register coupled to the tag data bus, the data input register being structured to receive and store tag data applied to the tag data bus;
   a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and
   a data output register coupled to the data output of the memory array, the data output register being structured to apply tag data to the tag data bus.

44. A computer system, comprising:
   a processor having an address bus port, a cache data bus port, a cache control bus port, a tag data bus port, and a tag control bus port;

an address bus coupled to the address bus port of the processor;

a cache data bus coupled to the cache data bus port of the processor;

a cache control bus coupled to the cache control bus port of the processor;

a tag data bus coupled to the tag data bus port of the processor;

tag control bus coupled to the tag control bus port of the processor; and a cache memory including a cache data portion and a tag data portion, the cache data portion having an address bus port coupled to the address bus, a cache data bus port coupled to the cache data bus, and a cache control bus port coupled to the cache control bus, and the tag data portion having a tag data bus port coupled to the tag data bus and tag control bus port coupled to the tag control bus, the processor being structured to perform snoops of the cache memory during a write of cache data from the processor to the cache memory, and wherein the processor is further structured to cancel the writing of cache data to the cache memory responsive to the snoop of the cache memory indicating a cache write miss.

45. The computer system of claim 44, further comprising a system memory coupled to the processor through a system bus.

46. The computer system of claim 44 wherein the system bus is independent from busses connecting the processor to the cache memory.

47. The computer system of claim 44 wherein a portion of the system bus is coupled to the cache memory so that a portion of the system bus is shared by the system memory and the cache memory.

48. The computer system of claim 44 wherein the processor is structured to transfer tag data to or from the tag data portion during a transfer of cache data to or from the cache data portion.

49. The computer system of claim 44 wherein the processor is structured to perform snoops of the cache memory during a transfer of data between the processor and the cache memory.

50. The computer system of claim 44 wherein the cache data portion of the cache memory comprises:

an address register coupled to the address bus, the address register being adapted to store an address applied to the address bus and to output from the address register an internal address;

a burst counter coupled to an output of the address register, the burst counter being structured to increment the internal address responsive to a clock signal;

a data input register coupled to the cache data bus, the data input register being structured to receive and store cache data applied to the cache data bus;

a memory array having an address input coupled to the address register and the burst counter, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array, the data output register being structured to apply cache data to the cache data bus.

51. The computer system of claim 44 wherein the tag data portion of the cache memory comprises:

an address register coupled to the address bus, the address register being adapted to store an address applied to the address bus and to output from the address register an internal address;

a data input register coupled to the tag data bus, the data input register being structured to receive and store tag data applied to the tag data bus;

a memory array having an address input coupled to the address register, a data input coupled to an output of the data input register, and a data output, the memory array being structured to store data applied to its data input at a location in the memory array indicated by the internal address, and to output data to its data output from a location in the memory array indicated by the internal address; and a data output register coupled to the data output of the memory array, the data output register being structured to apply tag data to the tag data bus.

* * * * *

UNITED STATES PATENT AND TRADEMARK OFFICE
CERTIFICATE OF CORRECTION

PATENT NO. : 6,725,344 B2
DATED : April 20, 2004
INVENTOR(S) : Joseph T. Pawlowski It is certified that error appears in the above-identified patent and that said Letters Patent is hereby corrected as shown below:

Column 3,
Line 23, "that a bust transfer" should read -- that a burst transfer --
Line 24, "system memory of the cache" should read -- system memory or the cache --
Line 47, "Ser. No. 08/68 1,674" should read -- Ser. No. 08/681,674 --

Column 6,
Line 26, "applies in input" should read -- applies input --

Column 7,
Line 43, "signal $D_{13}ENABLE^*$" should read -- signal D_ENABLE* --
Line 48, "during ninth through" should read -- during the ninth through --

Column 8,
Line 5, "A21, and tag date TD21" should read -- A21, the tag data TD21 --
Line 15, "portion 58, is either" should read -- portion 58, either --
Line 21, "are is illustrated" should read -- are illustrated --

Column 9,
Line 21, "signal $D_{13}ENABLE^*$" should read -- signal D_ENABLE* --

Column 10,
Lines 30-31, "structured to increments the" should read -- structured to increment the --

Column 11,
Line 8, "tag control bus" should read -- a tag control bus --

Column 14,
Lines 21-22, "structured to increments the" should read -- structured to increment the --

Column 15,
Lines 19-20, "structured to increments the" should read -- structured to increment the --
Line 64, "tag control bus" should read -- a tag control bus --

Column 16,
Line 5, "tag control bus port" should read -- a tag control bus port --

UNITED STATES PATENT AND TRADEMARK OFFICE
CERTIFICATE OF CORRECTION

PATENT NO. : 6,725,344 B2
DATED : April 20, 2004
INVENTOR(S) : Joseph T. Pawlowski It is certified that error appears in the above-identified patent and that said Letters Patent is hereby corrected as shown below:

<u>Column 17,</u>
Line 10, "tag control bus" should read -- a tag control bus --

Signed and Sealed this

Fourth Day of January, 2005

JON W. DUDAS
*Director of the United States Patent and Trademark Office*